United States Patent
Komatsu et al.

(10) Patent No.: US 9,670,939 B2
(45) Date of Patent: Jun. 6, 2017

(54) OPERATION CONTROL SYSTEM

(71) Applicant: KUBOTA CORPORATION, Osaka (JP)

(72) Inventors: Shigeru Komatsu, Osaka (JP); Atsushi Matsumoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 49 days.

(21) Appl. No.: 14/827,569

(22) Filed: Aug. 17, 2015

(65) Prior Publication Data
US 2016/0053779 A1   Feb. 25, 2016

(30) Foreign Application Priority Data
Aug. 19, 2014   (JP) ................. 2014-166538

(51) Int. Cl.
| | |
|---|---|
| *F15B 11/16* | (2006.01) |
| *B60K 37/06* | (2006.01) |
| *G05G 9/047* | (2006.01) |
| *F15B 13/06* | (2006.01) |
| *F15B 13/14* | (2006.01) |

(52) U.S. Cl.
CPC .............. *F15B 11/16* (2013.01); *B60K 37/06* (2013.01); *F15B 13/06* (2013.01); *F15B 13/14* (2013.01); *G05G 9/047* (2013.01); *B60K 2350/1016* (2013.01); *B60K 2350/1048* (2013.01); *B60K 2350/945* (2013.01); *B60Y 2200/221* (2013.01)

(58) Field of Classification Search
None
See application file for complete search history.

(56) References Cited

U.S. PATENT DOCUMENTS

| | | | | |
|---|---|---|---|---|
| 7,712,571 B2 * | 5/2010 | Proud | ................. | B60K 26/02 180/331 |
| 2005/0133292 A1* | 6/2005 | Ginzel | ................. | B60K 20/02 180/315 |

FOREIGN PATENT DOCUMENTS

| | | |
|---|---|---|
| EP | 2557238 | 2/2013 |
| JP | 2006-306236 | 11/2006 |
| JP | 2007-092284 | 4/2007 |
| WO | 2005/025919 | 3/2005 |

OTHER PUBLICATIONS

U.S. Appl. No. 11/473,115 to Proud et al., which was filed on Jun. 23, 2006.

* cited by examiner

*Primary Examiner* — John R Olszewski
*Assistant Examiner* — James M McPherson
(74) *Attorney, Agent, or Firm* — Greenblum & Bernstein, P.L.C.

(57) ABSTRACT

An operation control system for a work apparatus equipped to a work vehicle includes a controller controlling the work apparatus. A first hydraulic valve and a second hydraulic valve control hydraulic pressure supply to the work apparatus. An operation unit provides an operation input signal to the controller. A first mounting base and a second mounting base are provided adjacently to each other in the operation unit. A first single-operation tool is formed mountable on the first mounting base and a second single-operation tool is formed mountable on the second mounting base. Further, a multi-operation tool is mountable so as to straddle both the first mounting base and the second mounting base.

20 Claims, 7 Drawing Sheets

OPERATION CONTROL SYSTEM

CROSS-REFERENCE TO RELATED APPLICATIONS

The present application claims priority under 35 U.S.C. §119 of Japanese Application No. 2014-166538, filed on Aug. 19, 2014, the disclosure of which is expressly incorporated by reference herein in its entirety.

BACKGROUND OF THE INVENTION

1. Field of the Invention

The present invention relates to an operation control system for a work apparatus provided to a work vehicle.

2. Description of Related Art

It is known to provide, on a rear section of a work vehicle such as a tractor, various work apparatuses using a link-type hydraulic lifting apparatus. Accordingly, a plurality of hydraulic valves (often referred to as auxiliary control valves) are grouped as a unit and arranged on the rear of such a work vehicle. In addition, a front loader is sometimes provided to a front section of the work vehicle. For example, as for a tractor disclosed in Japanese Patent Laid Open Publication No. 2006-306236 (FIGS. 1 and 3), three auxiliary control valves are arranged on the rear of the tractor, and a tiller apparatus is attached through a hydraulic lifting link mechanism. In order to control ON/OFF modes of these auxiliary control valves, a front manipulation section is provided with three auxiliary control levers that are linked to the auxiliary control valves.

The front section of a tractor according to Japanese Patent Laid Open Publication No. 2007-92284 (FIGS. 1, 2, and 4) is provided with a front loader. Further, auxiliary control valves are also provided on the rear section of this tractor. A side console provided in a cabin interior is equipped with two auxiliary control levers controlling the auxiliary control valves. In addition, as a work apparatus controller controlling the front loader, a joystick lever is provided to a control box on a right side of a driver seat, with the joystick lever being interlocked/linked to the control valves of the front loader.

This type of work vehicle, such as the tractors described above, is provided with work apparatuses on the front of the vehicle body, such as a front loader controlled through hydraulic pressure, or on the back of the vehicle body, such as a tiller apparatus controlled through hydraulic pressure. For this reason, various operation tools are needed in order to control a plurality of auxiliary control valves, which complicates positioning of tools in the manipulation section. Further, the operation tools required are not only single-operation tools controlling ON/OFF modes as shown in Japanese Patent Laid Open Publication No. 2006-306236, but also a multi-operation tool (such as a joystick) controlling a plurality of operations as shown in Japanese Patent Laid Open Publication No. 2007-92284.

SUMMARY OF INVENTION

In view of the circumstances above, embodiments of the present invention provides an operation control system that efficiently arranges operation tools required for operating hydraulic valves needed for a work apparatus equipped to a work vehicle.

According to non-limiting aspects of the present invention, the operation control system for a work apparatus equipped to a work vehicle includes a controller controlling the work apparatus; a first hydraulic valve and a second hydraulic valve controlling hydraulic pressure supply to the work apparatus; an operation unit providing an operation input signal to the controller; and a first mounting base and a second mounting base provided adjacently to each other in the operation unit. A first single-operation tool is formed mountable on the first mounting base and a second single-operation tool is formed mountable on the second mounting base. Further, a multi-operation tool is formed mountable straddling over both the first mounting base and the second mounting base.

The operation unit provided near the driver seat is provided with a plurality of mounting bases that mount operation tools controlled by the driver. According to the present invention, the operation tools include a single-operation tool and a multi-operation tool, the single-operation tool being capable of a single operation such as an on/off switch, or a seesaw switch, the multi-operation tool being capable of operational displacement in a plurality of directions. According to the configuration described above, the present invention provides two options for the adjacent first mounting base and the second mounting base. One option is that the first single-operation tool is mounted on the first mounting base and the second single-operation tool is mounted on the second mounting base. Another option is that the multi-operation tool is mounted straddling over both the first mounting base and the second mounting base. With this configuration, the operation unit side can freely adapt regardless of whether a single-operation tool or a multi-operation tool controls a hydraulic valve controlling hydraulic pressure supply to a work apparatus equipped to a work vehicle. In other words, the first mounting base and the second mounting base may be used for mounting two single-operation tools, or may be used for mounting one multi-operation tool. Accordingly, it is possible to efficiently arrange operation tools required for operating hydraulic valves needed for a work apparatus equipped to a work vehicle.

According to one aspect of the present invention, the multi-operation tool is a joystick-type tool. An operation input signal generated based on displacement in one axial direction of the joystick-type tool is sent to the controller via the first mounting base, and an operation input signal generated based on displacement in another axial direction of the joystick-type tool is sent to the controller via the second mounting base. For controlling a work apparatus equipped with a plurality of hydraulic cylinders and performing complex movements, a joystick-type tool pivoting in a plurality of axis directions is generally employed. Therefore, the joystick-type tool is provided utilizing the first mounting base and the second mounting base, and operational displacement in each of the different directions is separately transmitted to the controller, thereby making it possible to control complex movements of the work apparatus. In particular, since one of the work apparatuses having complex movements is a front loader, when it is known in advance that a front loader will be provided to the work vehicle, one joystick-type tool is preferably mounted straddling over the first mounting base and the second mounting base.

Of course, the multi-operation tool such as the joystick-type tool can utilize operational displacement in different directions for controlling a first control valve and a second control valve, respectively. In other words, one multi-operation tool can be used as two single-operation tools. Accordingly, when a work vehicle is selectively provided with a work apparatus suitable to be used with a joystick-type tool (e.g., front loader) and a work apparatus requiring two separate hydraulic pressure supplies, it is preferable that the controller side can select an appropriate mode from two modes for the multi-operation tool. For this purpose, according to one aspect of the present invention, the controller includes a valve mode controller and a loader mode controller. The valve mode controller performs hydraulic valve mode control that controls, based on an operation input signal from the joystick-type tool, the first hydraulic valve and the second hydraulic valve. The loader mode controller performs front loader mode control that controls, based on an operation input signal from the joystick-type tool, a front loader via a front loader hydraulic valve unit. Further, when the joystick-type tool is provided with a selection device selecting between the hydraulic valve mode control and the front loader mode control, a driver can select a required hydraulic valve mode without error, thereby improving usability of the joystick-type tool.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
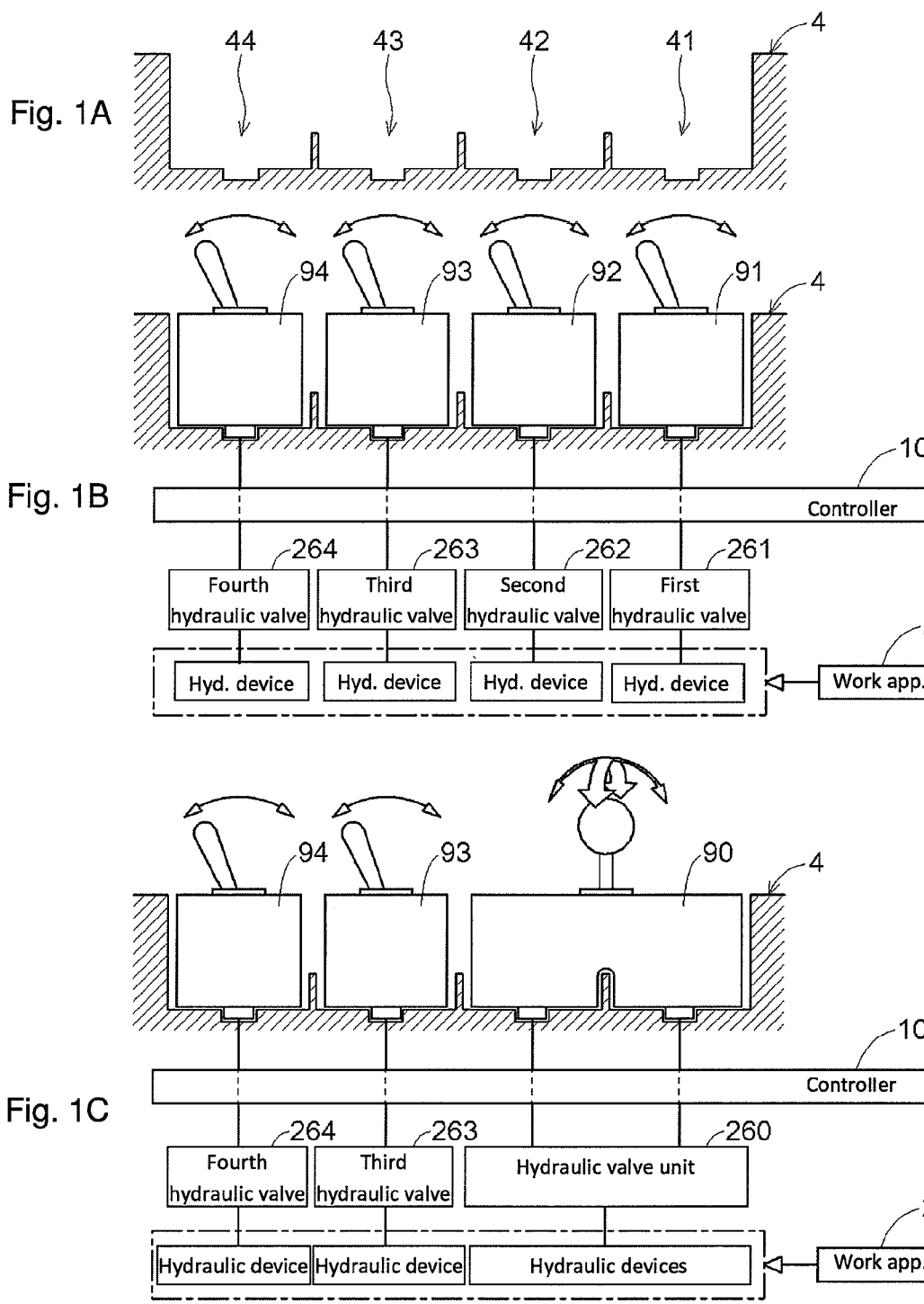
FIGS. 1A-1C are schematic diagrams that describe a basic configuration of an operation control system according to the present invention.

Before describing an operation control system according to specific embodiments of the invention, the basic configuration of features of the present invention is described using FIG. 1A-1C. FIG. 1A is a vertical cross sectional figure illustrating an operation unit 4 provided near a driver seat, with the operation unit 4 including a first mounting base 41, a second mounting base 42, a third mounting base 43, and a fourth mounting base 44 that are adjacently aligned with one another. Each of these mounting bases includes a mounting space, wherein an operation tool controlled by a driver is mounted. The tool can have the form of a switch (including a button, dial, volume control, etc.) or a lever type.

FIG. 1B shows a state where operation tools, which operate hydraulic valves supplying hydraulic pressure to a work apparatus 22 (see FIG. 2), are mounted to each of the mounting bases of the operation unit 4. A first single-operation tool 91 is mounted to the first mounting base 41; a second single-operation tool 92 is mounted to the second mounting base 42; a third single-operation tool 93 is mounted to the third mounting base 43; and a fourth single-operation tool 94 is mounted to the fourth mounting base 44. "Single-operation tool" in this example is a tool switchable between two modes. For example, the single-operation tool is switched to one mode for opening the hydraulic valve, or the other mode for closing the hydraulic valve. In the example of FIG. 1B, when an operation input signal based on an operation of the first single-operation tool 91 is sent to a controller 100, the controller 100 transmits, to a first hydraulic valve 261, a control signal for switching between the two modes for opening or closing the first hydraulic valve 261. Similarly, when an operation input signal based on an operation of the second single-operation tool 92 is transmitted, a second hydraulic valve 262 is switched to an open/closed mode. When an operation input signal based on an operation of the third single-operation tool 93 is transmitted, a third hydraulic valve 263 is switched to an open/closed mode. Further, when an operation input signal based on an operation of the fourth single-operation tool 94 is transmitted, a fourth hydraulic valve 264 is switched to an open/closed mode.

FIG. 1C illustrates another mounting configuration as a substitute for the mounting style of the operation tools shown in FIG. 1B. In FIG. 1C, the third mounting base 43 and the fourth mounting base 44 of the operation unit 4 are mounted with the third single-operation tool 93 and the fourth single-operation tool 94, respectively. However, the first mounting base 41 and the second mounting base 42 are mounted with a multi-operation tool 90 straddling both the first mounting base 41 and the second mounting base 42. The multi-operation tool 90, which can be similar to a joystick-type tool, can operate a plurality of hydraulic valves. For example, when an operation input signal based on an operation in one direction is transmitted to the controller 100, the controller 100 transmits a control signal to one hydraulic valve configuring a hydraulic valve unit 260. When an operation input signal based on an operation in the other direction is transmitted to the controller 100, the controller 100 transmits a control signal to the other hydraulic valve configuring the hydraulic valve unit 260.

The multi-operation tool 90 shown in FIG. 1C is suitable for operating a work apparatus including a plurality of hydraulic cylinders, such as a front loader. Therefore, when equipping a front loader to a work vehicle on which this operation control system is installed, it is preferable to provide, in advance, the multi-operation tool 90 (shown in FIG. 1C) straddling over both the first mounting base 41 and the second mounting base 42. In addition, by assigning the two different operation directions of the multi-operation tool 90 to the first hydraulic valve 261 and the second hydraulic valve 262, the multi-operation tool 90 can be utilized as the first single-operation tool 91 and the second single-operation tool 92. In that case, a selection device such as a selection switch may be provided, which can select between a mode for assigning the multi-operation tool 90 to the hydraulic valve unit 260, and a mode for assigning the multi-operation tool 90 to the first hydraulic valve 261 and the second hydraulic valve 262.

Figure 2:
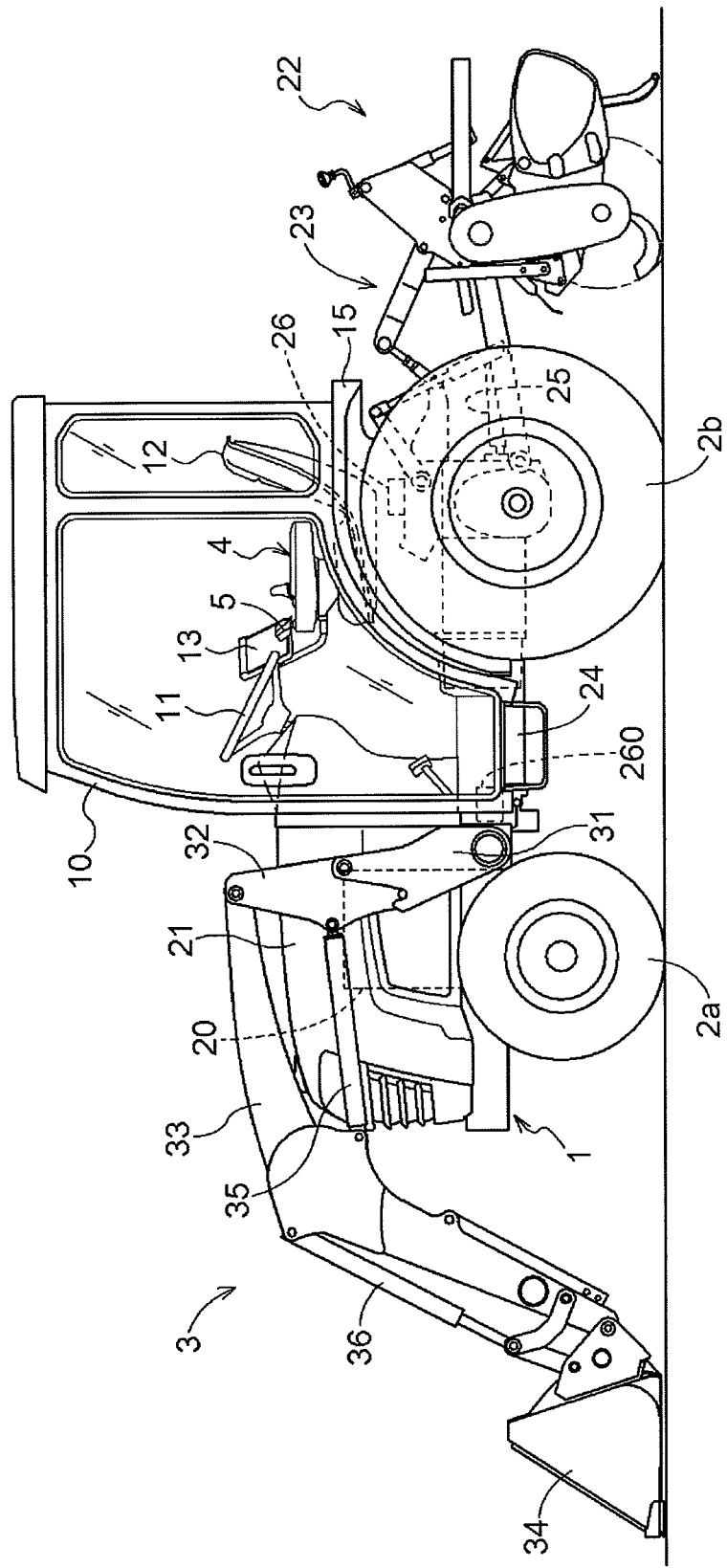
FIG. 2 is a side view of a tractor illustrating an embodiment of the work vehicle on which the operation control system according to the present invention is mounted or utilized.

Next, a specific embodiment of a work vehicle equipped with the operation control system according to the present invention is described with reference to the drawings. FIG. 2 is a side view of a tractor that is an example of the work vehicle. The tractor has a vehicle body 1 supported by front wheels 2a and rear wheels 2b, an engine 20 mounted in a front portion of the vehicle body 1, and a transmission 24 mounted rearward of the engine 20. A rotary tiller 22 is mounted toward the rear of the vehicle body 1 as a work apparatus, with the rotary tiller 22 being mounted so as to be movable in a vertical direction via a lift mechanism 23. The tractor is a four-wheel-drive vehicle and motive force of the engine 20 is transmitted, via a speed change mechanism installed in the transmission 24, to the rear wheels 2b and front wheels 2a, which are capable of acting as drive wheels. Further, the power of the engine 20 is also transmitted to the rotary tiller 22 via a PTO shaft 25 that protrudes rearward from the transmission 24. The engine 20 is covered by a hood 21. A cabin 10 is supported on the vehicle body 1 to the rear of the hood 21 and above the transmission 24.

In FIG. 2, a front loader 3 is provided in front of the vehicle body 1 so as to straddle the hood 21. In reality, the front loader 3 and the rotary tiller 22 need not provided together to a work vehicle, and only one of them can be provided at one time. However, for illustration purposes, FIG. 2 shows a tractor having both the front loader 3 and the rotary tiller 22 together. When equipping the front loader 3, a pair of left/right masts 31 are attached to the vehicle body 1 on both left and right sides of the rear section of the hood 21. The body of the front loader 3 is attached to the left/right masts 31. The body of the front loader 3 is configured with a pair of left/right side frames 32 and a pair of left/right booms 33, with the left/right side frames 32 being attached to the respective left/right masts 31, and with the pair of left/right booms 33 being pivotally supported and coupled to an upper section of the respective left/right side frames 32 and being supported in a vertically swingable manner. On the front end sides of the left/right booms 33, a bucket 34 is pivotally supported and coupled in a vertically swingable manner. Further, the front loader 3 is provided with boom cylinders 35 that vertically pivot the booms 3, and bucket cylinders 36 that vertically pivot the bucket 34. The boom cylinders 35 and the bucket cylinders 36 are configured as hydraulic cylinders.

The motive force of the engine 20 drives a hydraulic pump (not shown in the drawings), and hydraulic fluid pumped by this hydraulic pump is supplied to an external hydraulic operation device via a hydraulic valve group 26. The hydraulic valve group 26 includes, in the rear section of the vehicle 1, a first hydraulic valve 261, a second hydraulic valve 262, a third hydraulic valve 263, a fourth hydraulic valve 264, a fifth hydraulic valve (not shown in the drawings), and a sixth hydraulic valve (not shown in the drawings). Further, the hydraulic valve group 26 also includes a hydraulic valve unit 260 for the front loader 3, with the hydraulic valve unit 260 being provided on a front bottom end of the cabin 10 of the vehicle body 1. The hydraulic valve unit 260 is configured to operate the boom cylinders 35 and the bucket cylinders 36 according to an operation of the driver.

An interior of the cabin 10 serves as a driver space, at a front portion of which is arranged a steering handle or steering wheel 11 steering the front wheels 2a and at a rear portion of which is arranged a driver seat 12, with the driver seat 12 being positioned between a left-right pair of rear wheel fenders 15. An armrest operation device, functioning as the operation unit 4 having a multifunction operation tool 5, spans from a side of the driver seat 12 to a front side thereof. Accordingly, the operation unit 4 is referred to as an armrest operation device 4. A display 13 visually notifying the driver of various information is provided forward of the armrest operation device 4. The display 13 allows an input operation to be performed via a touch panel 13A (see FIG. 3) and can accept various operation inputs by the driver.

Figure 3:
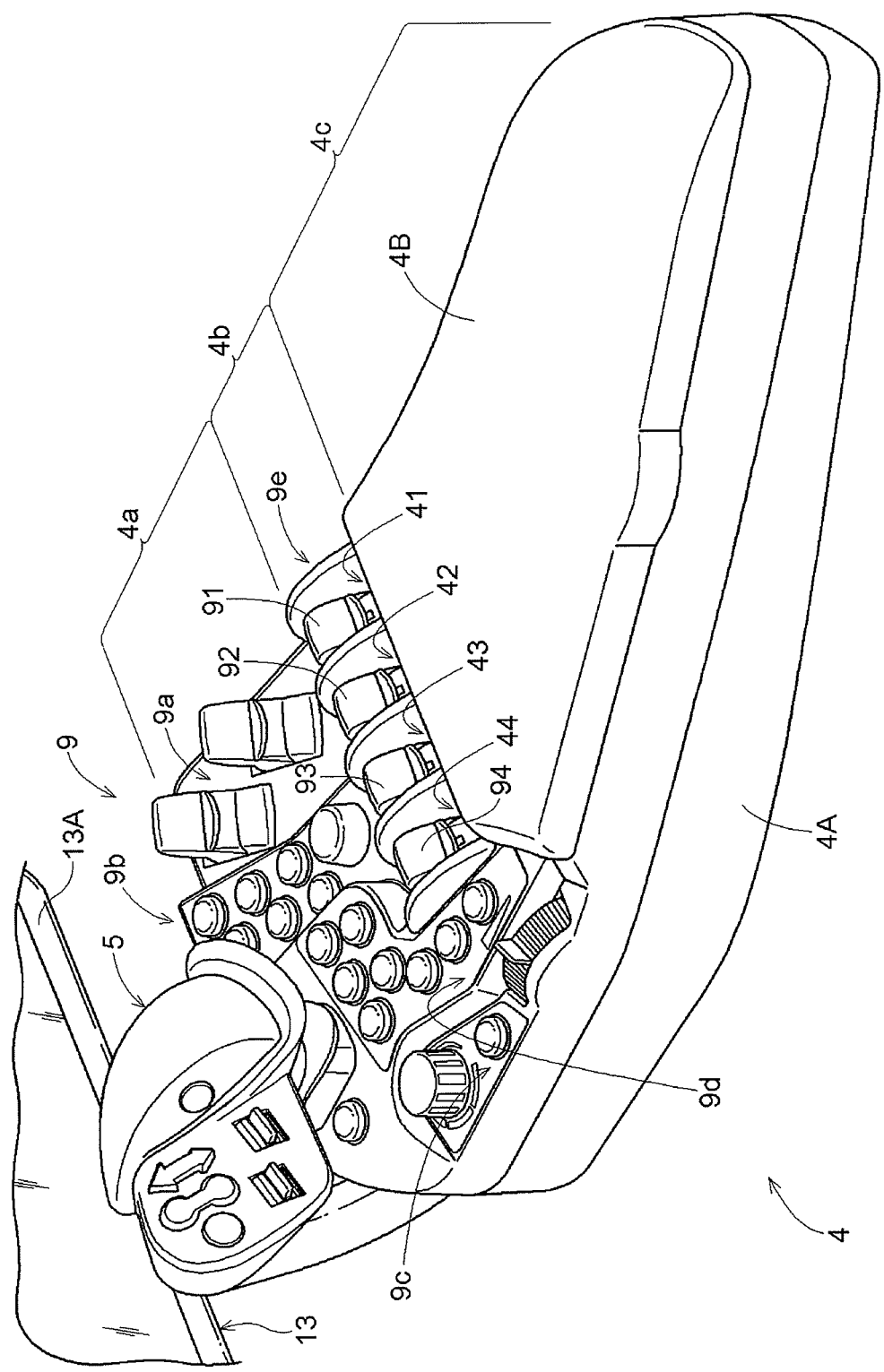
FIG. 3 is a perspective view of an armrest operation device of the tractor having a rotary tiller as a work apparatus.

As illustrated in FIG. 3, the armrest operation device 4 includes an armrest bed 4A as a base, and can be divided in a plan view into a front region 4a, a middle region 4b and a rear region 4c. A cushioning armrest portion 4B on which an arm is rested is provided in the rear region 4c. The multifunction operation tool 5, described in detail hereafter, is located on substantially a left half of the front region 4a. A first operation switch group 9a and a second operation switch group 9b, forming part of operation switch groups 9, are located on substantially a right half of the front region 4a. From the left, a third operation switch group 9c, a fourth operation switch group 9d, and a fifth operation switch group 9e, also being part of the operation switch groups 9, are arranged in the middle region 4b. The operation switches of the operation switch groups 9 may have various forms such as a button, switch, dial, lever, joystick, or the like.

The configuration explained using FIG. 1A-1C can be applied to the fifth operation switch group 9e in the present embodiment. In other words, in an area of the armrest bed 4A where the fifth operation switch group 9e is positioned, the first mounting base 41, the second mounting base 42, the third mounting base 43, and the fourth mounting base 44 are adjacently formed from right to left. To each of the first mounting base 41, the second mounting base 42, the third mounting base 43, and the fourth mounting base 44, the first single-operation tool 91 for the first hydraulic valve 261, the second single-operation tool 92 for the second hydraulic valve 262, the third single-operation tool 93 for the third hydraulic valve 263, and the fourth single-operation tool 94 for the fourth hydraulic valve 264 are respectively mounted. All of the single-operation tools in this example are formed as seesaw type switches. In particular, the armrest operation device 4 shown in FIG. 3 has a basic configuration shown in FIG. 1B.

Figure 4:
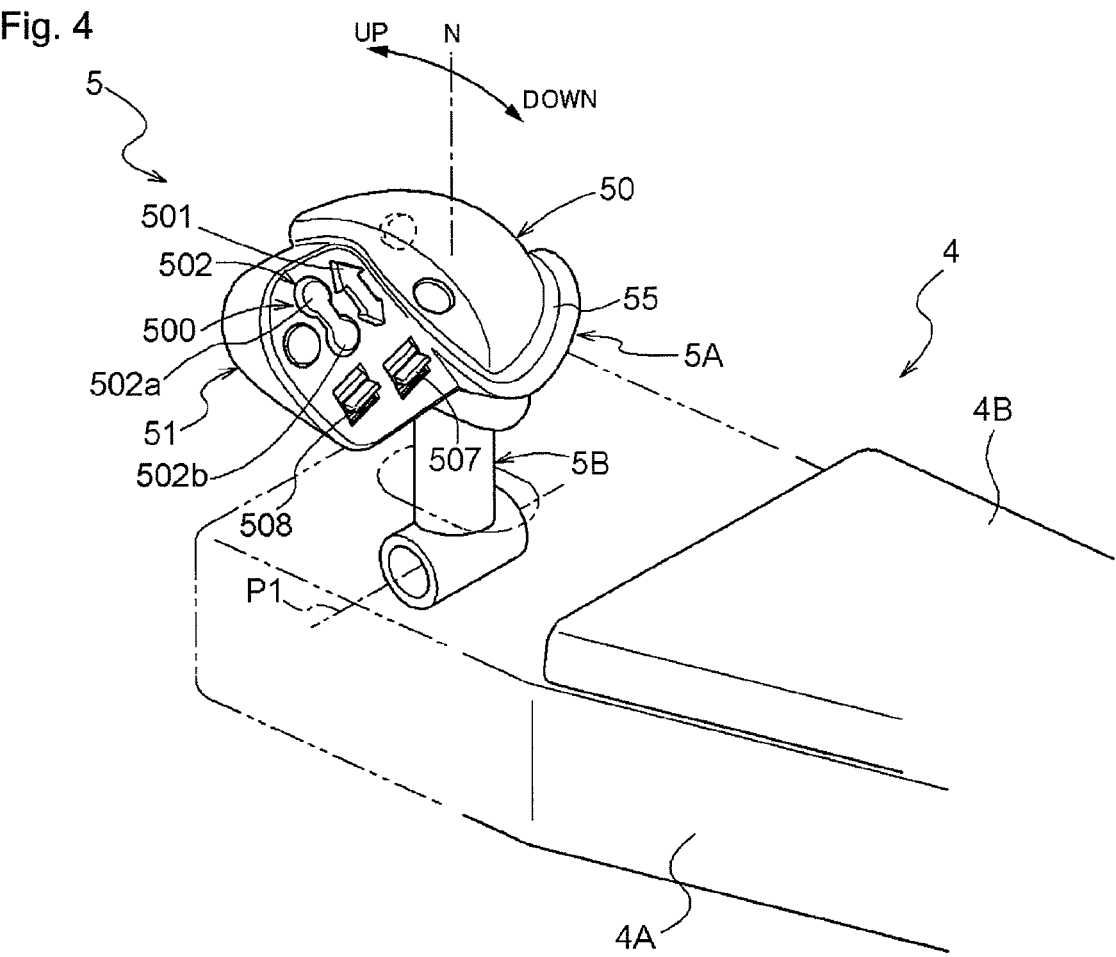
FIG. 4 is a perspective view of a multifunction operation tool provided to the armrest operation device.

As shown in FIG. 4, the multifunction operation tool 5 is arranged in a front end area on the left side of the armrest bed 4A and is swingably supported around a swing axis P1. The multifunction operation tool 5 is substantially configured by a grip main body 5A and a swing body 5B. The swing body 5B is formed as an arm member pivoting around the swing axis P1. The vehicle is structured to accelerate by swinging the swing body 5B in a forward direction (UP) (upshift) from a swing neutral position of the swing body 5B, and to decelerate by swinging the swing body 5B in a backward direction (DOWN) (downshift).

The grip main body 5A is provided on a free or upper end side of the swing body 5B. As shown in FIG. 4, the grip main body 5A includes a grip portion 50 formed in a right-side region (here, substantially a right half region) and an elongated portion 51 formed in a left half region. A tab projecting outward is formed on at least a portion of a bottom edge of the grip portion 50 and functions as a hypothenar rest 55.

An operation switch group 500 capable of being operated by fingers of a hand holding the grip portion 50 is arranged on the grip main body 5A. The operation switch group 500 includes a forward/reverse button 501, a lift/lower button 502, and two switches 507 and 508 controlling the fifth and sixth hydraulic valves (not shown in the drawings) configuring the hydraulic valve group 26. These switches 507 and 508 are also formed as seesaw type switches.

Through the operation of the lift mechanism 23 shown in FIG. 2, the lift/lower button 502 acts as an elevation control tool lifting/lowering the rotary tiller 22 as a work apparatus. Pressing an upper portion 502a of the lift/lower button 502 raises the rotary tiller 22, whereas pressing a lower portion 502b of the lift/lower button 502 lowers the rotary tiller 22.

Switching (shift up, shift down) of a speed change stage in the transmission 24 is performed by a swinging operation around the swing axis P1 of the grip part 50. By pressing an upward arrow of the forward/reverse button 501, the tractor is switched to a forward travel state, and by pressing a downward arrow of the forward/reverse button 501, the tractor is switched to a reverse travel state.

Figure 5:
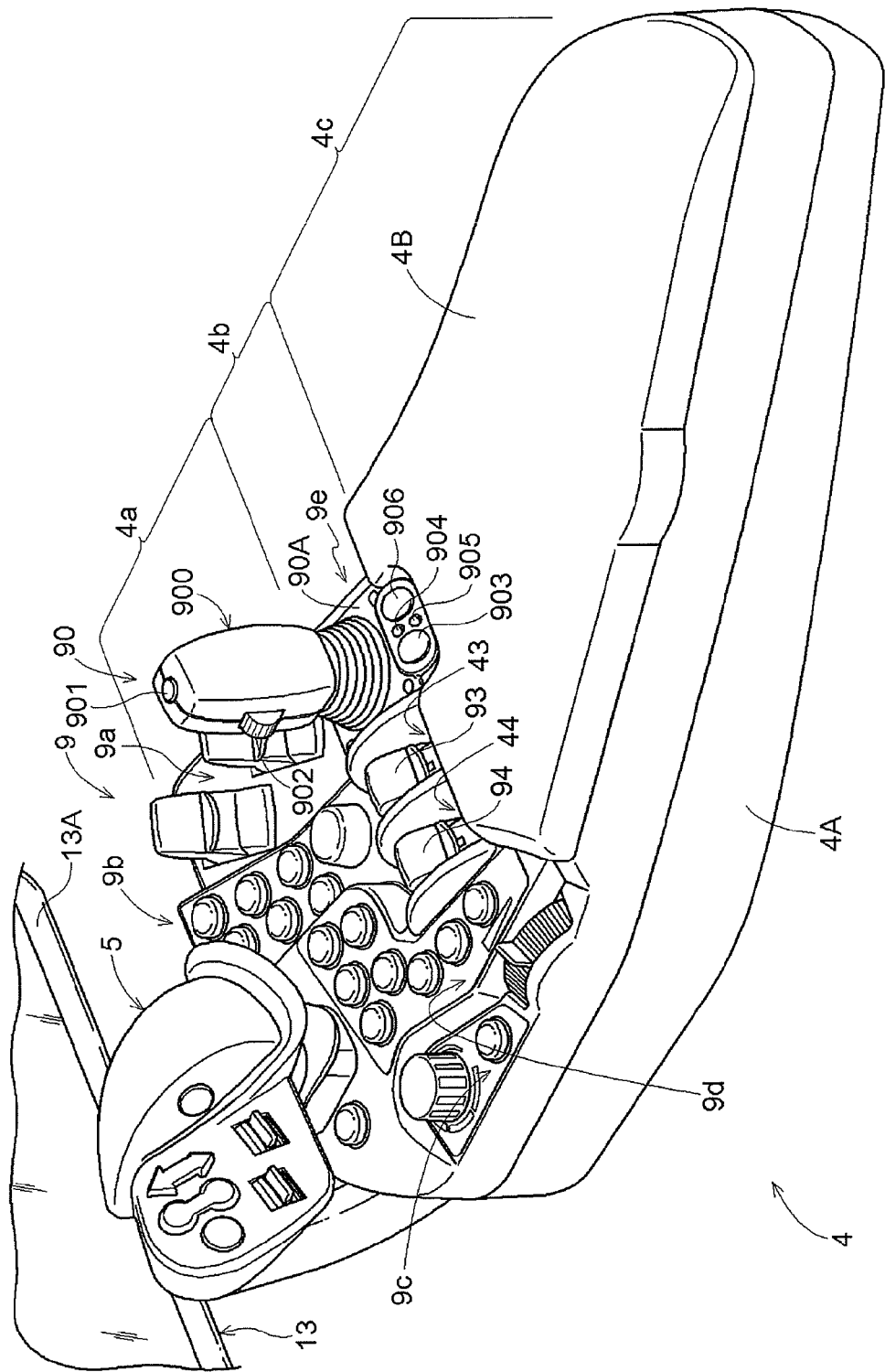
FIG. 5 is a perspective view of the armrest operation device of the tractor having a front loader as the work apparatus.

In a particular embodiment, the armrest operation device 4 can be of the type shown in FIG. 5 and which can have a basic configuration shown in FIG. 1C. The armrest operation device 4 is employed when the front loader 3 is provided. Compared to the armrest operation device 4 shown in FIG. 3, this armrest operation device 4 (shown in FIG. 5) differs only in the configuration of the fifth operation switch group 9e. Therefore, only the difference of the configuration is explained below. Spanning the first mounting base 41 and the second mounting base 42, one joystick type operation tool is mounted as the multi-operation tool 90. This joystick type tool includes a joystick body 900 extending upward from a mounting plate 90A. The joystick body 900 has a rounded stick body pivoting about an X axis and a Y axis. In the present embodiment, a first fingertip operation tool 901 is formed as a push button on the top of the joystick body 900, and a second fingertip operation tool 902 is formed as a dial switch on a side of the joystick body 900. The use of the first fingertip operation tool 901 and the second fingertip operation tool 902 is optional. For example, these fingertip operation tools can be assigned as tools to store information such as an elevation location of the bucket 34. An operation input signal generated by operating the multi-operation tool 90 is input to the controller (see FIG. 7), and the front loader 3 is caused to operate via the hydraulic valve unit 260 for the front loader. The hydraulic valve unit 260 for the front loader is hereafter referred to simply as the hydraulic valve unit 260.

Since the multi-operation tool 90 is a joystick type operation tool capable of causing X axis and Y axis operational displacement, one operational displacement can be assigned to the first hydraulic valve 261, and the other operational displacement can be assigned to the second hydraulic valve 262. In other words, instead of using the multi-operation tool 90 for operating the front loader 3 (for operating the hydraulic valve unit 260, i.e., "front loader mode control"), the multi-operation tool 90 may be used for operating, for example, the first hydraulic valve 261 and the second hydraulic valve 262 (two hydraulic valves belonging to the hydraulic valve group 26 to the rear of the tractor) (i.e., "hydraulic valve mode control"). For this purpose, the mounting plate 90A is provided with a mode selection button 903 that makes a selection between the front loader mode control and the hydraulic valve mode control. This mode selection button 903 is an alternate operational type, which selects the front loader mode control by one push, and selects the hydraulic valve mode control by a second push. When the front loader mode control is selected, a first mode lamp 904 is illuminated, and when the hydraulic valve mode control is selected, a second mode lamp 905 is illuminated. The mounting plate 90A is further provided with a lever lock button 906 which makes a selection between lever locking and lever unlocking.

Figure 6:
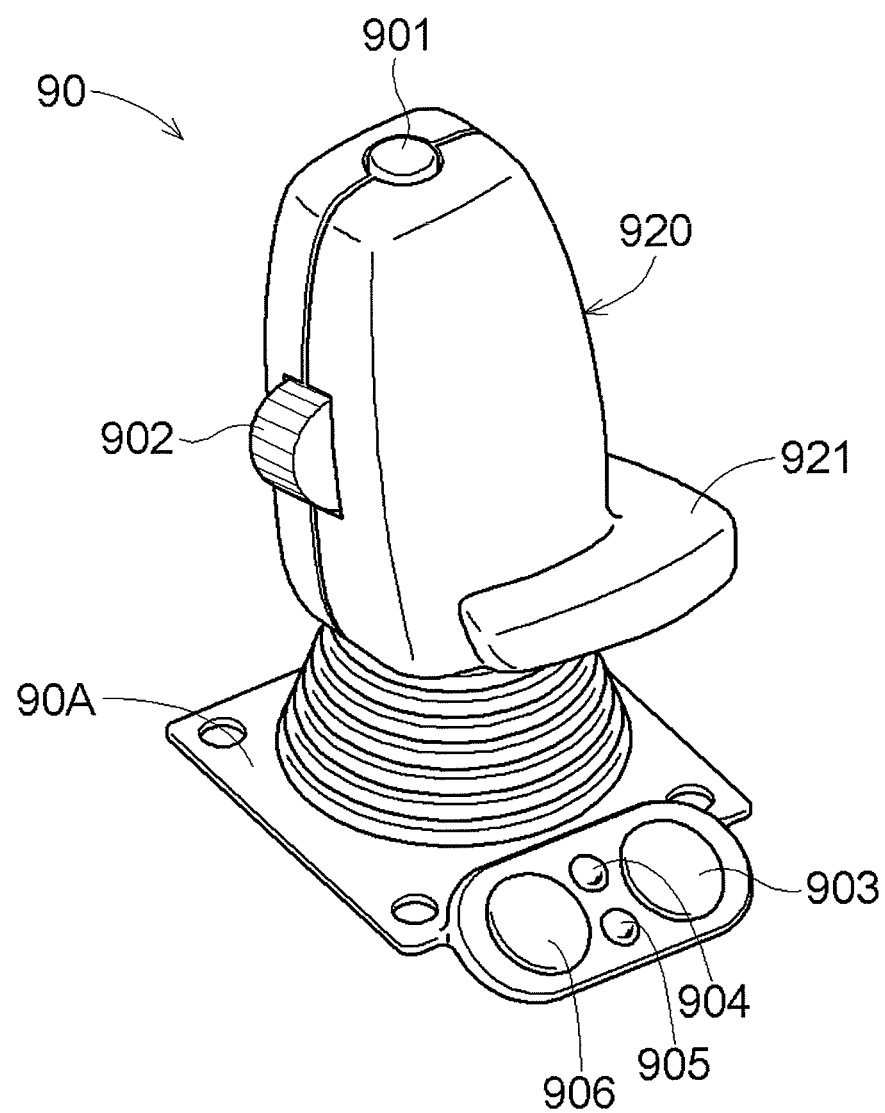
FIG. 6 is a perspective view illustrating another embodiment of a joystick-type multi-operation tool.

FIG. 6 illustrates a multi-operation tool 90 according to another embodiment, which can span the first mounting base 41 and the second mounting base 42. This multi-operation tool 90 is also a joystick-type tool. Compared to what was shown in FIG. 5, a joystick body 920 of the multi-operation tool 90 illustrated in FIG. 6 is more ergonomic, and has a shape easier to grip. Further, the joystick body 920 includes a hypothenar rest 921 on the lower end thereof, the hypothenar rest 921 used for resting a hypothenar of a hand gripping the joystick body 920. Similar to the joystick body 900 previously discussed, this joystick body 920 also includes the first fingertip operation tool 901 and the second fingertip operation tool 902.

Figure 7:
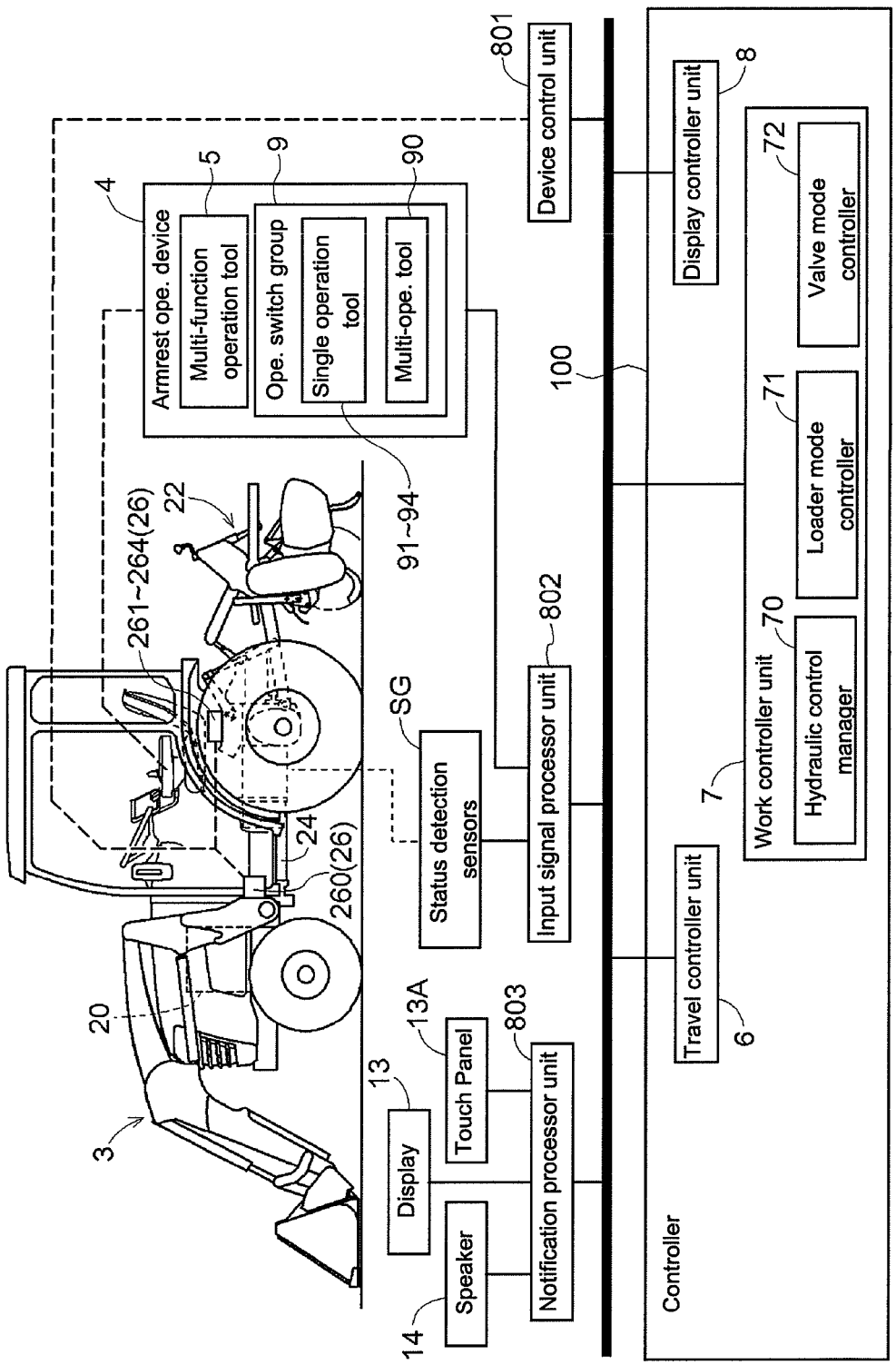
FIG. 7 is a functional block diagram of a control scheme provided to the tractor.

In FIG. 7, a control system equipped on the tractor is illustrated in the form of a functional block diagram. Examples of this control system include, in relation to the present invention, the controller 100, a device control unit 801, an input signal processor unit 802, and a notification processor unit 803 that are mutually connected so as to transmit data through a LAN installed to the vehicle. This illustrated configuration is merely for explanatory purposes. For a construction of an actual control system, arbitrary division or integration is possible.

The device control unit 801 controls operation of the controllers for the engine 20, hydraulic device for the transmission 24, and the hydraulic valve group 26 (units 260-264, supplying hydraulic pressure to the work apparatus 22 provided to the rear of the tractor, e.g., rotary tiller, or to the front loader 3 provide to the front of the tractor), by sending operation signals generated based on the control signals from the controller 100. The input signal processor unit 802 is an input interface, inputting signals from the multifunction operation tool 5, the operation switch groups 9, and a group of status detection sensors SG (configured with various sensors) and transferring the input signals to various portions of the control system. The notification processor unit 803 is an input/output interface, processing image signals output to the display 13, audio signals output to a speaker 14, or operation input signals from the touch panel 13A.

The controller 100 includes, as portions to realize various functions mainly by computer programs, a travel controller unit 6, a work controller unit 7, and a display controller unit 8. The travel controller unit 6 outputs via the device control unit 801 a speed change control command to a main speed change device and an auxiliary speed change device that configure the transmission 24 and creates a desired vehicle speed change ratio due to a combination of speed change stages of the main speed change device and the auxiliary speed change device.

The display controller unit 8 transmits various screen data that is generated to the notification processor unit 803. Accordingly, a desired screen is displayed on the display 13. The screen displayed on the display 13 includes a screen for guiding/warning the driver based on signals from the group of status detection sensors SG, and a screen for assisting the driver by displaying statuses such as engine revolutions, speed change stage, vehicle speed, and hydraulic devices.

The work controller unit 7 includes a hydraulic control manager 70, a valve mode controller 72, and a loader mode controller 71. The hydraulic control manager 70 generates control signals for controlling the work apparatus 22 (including the lift mechanism 23) or the front loader 3, based on the signals transmitted via the input signal processor unit 802 from the multifunction operation tool 5 and the operation switch groups 9 (arranged on the armrest operation device 4). In the present embodiment, the multi-operation tool 90 may be configured to operate the first hydraulic valve 261 and the second hydraulic valve 262, similar to the first single-operation tool 91 and the second single-operation tool 92, with the multi-operation tool 90 being provided as a joystick type operation tool instead of the first single-operation tool 91 and the second single-operation tool 92. This selection can be made by pressing the mode selection button 903, which causes the valve mode controller 72 to operate. Further, when the multi-operation tool 90 is configured to control the front loader 3, the loader mode controller 71 is operated. In other words, the valve mode controller 72 performs hydraulic valve mode control that controls the first hydraulic valve 261 and the second hydraulic valve 262 based on the operation input signals from the multi-operation tool (joystick type operation tool) 90. Further, the loader mode controller 71 controls the hydraulic valve unit 260 based on the operation input signals from the same multi-operation tool 90, and, as a result, performs front loader mode control controlling the front loader 3.

Other Embodiments (1) In the above-described embodiment, the rotary tiller 22 can be provided at the rear of the tractor and the front loader 3 is provided at the front of the tractor and there are examples of a work apparatus equipped on a work vehicle. Alternatively, the operation control system according to the present invention can be applied even when other types of work apparatuses are utilized or mounted to the work vehicle.

(2) In the above-described embodiment, the operation switch groups 9 are arranged on the armrest operation device 4. However, the operation switch groups 9 can be arranged on an operation console in a conventional manner.

(3) The functional blocks in FIG. 7 are merely for illustration purposes. The respective function units can be arbitrarily integrated or divided. In particular, the various portions configuring the controller 100 are linked to one another by software, and therefore, in many practical cases, duplication of these portions is common. The functional elements illustrated in FIG. 7 are only displayed schematically and are not limited to the divisions illustrated in FIG. 7.

The operation control system according to the present invention may be applied to a work vehicle that can accommodate various work apparatuses interchangeably equipped to the vehicle body, such as a tractor.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An operation control system for a work apparatus arranged on or mounted to a work vehicle comprising:
    a controller controlling the work apparatus;
    at least a first hydraulic valve and at least a second hydraulic valve configured to control hydraulic pressure supply to the work apparatus;
    an operation unit providing an operation input signal to the controller;
    the operation unit comprising at least a first mounting base arranged adjacent at least a second mounting base;
    the first mounting base being configured to receive a first single-operation tool;
    the second mounting base being configured to receive a second single-operation tool; and
    a multi-operation tool mountable to both the first mounting base and the second mounting base.

2. The operation control system according to claim 1, further comprising a first single-operation tool mountable on the first mounting base and a second single-operation tool mountable on the second mounting base.

3. The operation control system according to claim 1, wherein movement of the multi-operation tool along one axis generates a control signal via the first mounting base and movement of the multi-operation tool along another axis generates a control signal via the second mounting base.

4. The operation control system according to claim 1, wherein the multi-operation tool is a joystick.

5. The operation control system according to claim 4, wherein movement of the joystick along one axis sends a signal to the controller via the first mounting base and movement of the joystick along another axis sends a signal to the controller via the second mounting base.

6. The operation control system according to claim 5, wherein the controller comprises:
    a valve mode controller performing hydraulic valve mode control that controls, based on an operation input signal, the first hydraulic valve and the second hydraulic valve.

7. The operation control system according to claim 6, wherein the controller comprises:
    a loader mode controller performing front loader mode control that controls, based on an operation input signal, a front loader via a front loader hydraulic valve unit.

8. The operation control system according to claim 1, wherein the controller comprises:
    a valve mode controller performing hydraulic valve mode control that controls, based on an operation input signal, the first hydraulic valve and the second hydraulic valve.

9. The operation control system according to claim 8, wherein the controller comprises:
    a loader mode controller performing front loader mode control that controls, based on an operation input signal, a front loader via a front loader hydraulic valve unit.

10. The operation control system according to claim 1, wherein the multi-operation tool comprises at least one of:

a joystick having a hydraulic mode selection device mounted thereon; and a joystick having a selector switch for switching between a hydraulic valve mode control and a front loader mode control.

11. An operation control system for controlling operation of a work apparatus mounted to a work vehicle, comprising:
a controller controlling the work apparatus;
at least a first valve and at least a second valve configured to control movement of the work apparatus;
an operation unit coupled to the controller;
the operation unit comprising at least first and second mounting interfaces;
the first mounting interface being configured to receive a first single-operation device;
the second mounting interface being configured to receive a second single-operation device; and
a multi-operation device mountable to both the first and second mounting interfaces.

12. The operation control system according to claim 11, further comprising a first single-operation device mountable on the first mounting interface and a second single-operation device mountable on the second mounting interface.

13. The operation control system according to claim 12, wherein the first single-operation device is a switch and the second single-operation device is a switch.

14. The operation control system according to claim 11, wherein the first mounting interface is arranged adjacent the second mounting interface.

15. The operation control system according to claim 11, wherein the first and second mounting interfaces are arranged on at least one of:
an armrest; and
an operation device located in a cabin of the work vehicle.

16. The operation control system according to claim 11, wherein the multi-operation device comprises at least one of:
a joystick having a hydraulic mode selection device mounted thereon; and
a joystick having a selector switch for switching between a hydraulic valve mode control and a front loader mode control.

17. A method of controlling a work apparatus on a work vehicle using the operation control system of claim 11, the method comprising:
removing the first single-operation device from the first mounting interface;
removing the second single-operation device from the second mounting interface;
installing the multi-operation device via the first and second mounting interfaces; and
operating the work apparatus using the multi-operation device.

18. An operation control system for controlling operation of a work apparatus mounted to a work vehicle, comprising:
a controller controlling the work apparatus;
at least a first valve and at least a second valve configured to control movement of the work apparatus;
an operation unit arranged in a cabin of the work vehicle and communicating with the controller;
the operation unit comprising at least first and second mounting interfaces;
the first mounting interface being configured to receive a first operation device;
the second mounting interface being configured to receive a second operation device; and
a multi-operation device mountable to both the first and second mounting interfaces.

19. The operation control system according to claim 18, further comprising, when the multi-operation devices is not mounted to the first and second mounting interfaces, a first operation device is removably mounted on the first mounting interface and a second operation device is removably mounted on the second mounting interface.

20. A method of controlling a work apparatus on a work vehicle using the operation control system of claim 19, the method comprising:
removing the first operation device from the first mounting interface;
removing the second operation device from the second mounting interface;
installing the multi-operation device via the first and second mounting interfaces; and
operating the work apparatus using the multi-operation device.

* * * * *